United States Patent
Enderle et al.

(10) Patent No.: US 7,228,642 B2
(45) Date of Patent: Jun. 12, 2007

(54) PROBE FOR A COORDINATE MEASURING MACHINE

(75) Inventors: Eckhard Enderle, Aalen (DE); Monika Herb, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 11/515,516

(22) Filed: Sep. 1, 2006

(65) Prior Publication Data

US 2007/0056177 A1 Mar. 15, 2007

Related U.S. Application Data

(63) Continuation of application No. PCT/EP05/01867, filed on Feb. 23, 2005.

(30) Foreign Application Priority Data

Mar. 5, 2004 (DE) .................... 10 2004 011 730

(51) Int. Cl.
*G01B 5/00* (2006.01)

(52) U.S. Cl. .......................... 33/561; 33/558
(58) Field of Classification Search ..................... None
See application file for complete search history.

(56) References Cited

U.S. PATENT DOCUMENTS

| | | | |
|---|---|---|---|
| 3,824,893 A | 7/1974 | Sartorio | |
| 3,835,338 A | 9/1974 | Martin | |
| 4,621,434 A | 11/1986 | Hirschmann | |
| 4,720,922 A | 1/1988 | Strauss | |
| 5,012,591 A * | 5/1991 | Asakawa | 33/832 |
| 5,088,208 A * | 2/1992 | Wells et al. | 33/559 |
| 5,345,689 A | 9/1994 | McMurtry et al. | |
| 5,445,249 A | 8/1995 | Aida et al. | |
| 5,548,902 A | 8/1996 | Ernst | |
| 5,623,766 A | 4/1997 | Ruck et al. | |
| 6,314,800 B1 * | 11/2001 | Nishimura | 73/105 |
| 6,370,788 B1 | 4/2002 | Hellier et al. | |
| 6,886,265 B2 * | 5/2005 | Fracheboud et al. | 33/559 |
| 7,076,882 B2 * | 7/2006 | Dall'Aglio et al. | 33/551 |
| 7,124,514 B2 * | 10/2006 | McMurtry et al. | 33/556 |
| 2004/0128848 A1 | 7/2004 | Szenger et al. | |
| 2005/0283990 A1 * | 12/2005 | McMurtry et al. | 33/556 |
| 2006/0070253 A1 * | 4/2006 | Ruijl et al. | 33/559 |

FOREIGN PATENT DOCUMENTS

| | | |
|---|---|---|
| CA | 2 006 556 | 6/1990 |
| DE | 2 022 727 | 12/1970 |
| DE | 2 232 858 | 1/1973 |

(Continued)

*Primary Examiner*—Christopher W. Fulton
(74) *Attorney, Agent, or Firm*—Harness, Dickey & Pierce, P.L.C.

(57) ABSTRACT

A probe for a coordinate measuring machine has a stationary first part and a second part which can move relative to said first part. The second part can be a feeler pin or a feeler pin extension of the probe. A damping member for damping vibrations of the moveable second part has a magnet arrangement for producing a magnetic field, and has a conductor element. The magnet arrangement is designed such that there is a change in direction of the magnetic field along a path of movement of the conductor element.

20 Claims, 7 Drawing Sheets

FOREIGN PATENT DOCUMENTS

| | | |
|---|---|---|
| DE | 24 40 692 | 4/1975 |
| DE | 32 10 711 A1 | 2/1984 |
| DE | 36 25 636 A1 | 2/1988 |
| DE | 38 43 776 A1 | 7/1990 |
| DE | 44 24 225 A1 | 1/1996 |
| DE | 197 31 005 A1 | 2/1999 |
| DE | 101 47 614 A1 | 4/2002 |
| DE | 101 00 350 A1 | 7/2002 |
| EP | 0 239 337 | 9/1987 |
| EP | 0 299 033 B2 | 8/1994 |
| EP | 1 320 719 B1 | 6/2003 |
| GB | 915897 | 1/1963 |
| GB | 1 239 864 | 7/1971 |
| GB | 2 035 564 | 6/1980 |
| WO | 2004/040233 A1 | 5/2004 |

\* cited by examiner

PROBE FOR A COORDINATE MEASURING MACHINE

CROSS REFERENCE TO RELATED APPLICATIONS

This application is a continuation of international patent application PCT/EP2005/001867, filed on Feb. 23, 2005 and published in German language, which international application claims priority from German patent application DE 10 2004 011 730.6 filed on Mar. 5, 2004.

BACKGROUND OF THE INVENTION

The present invention relates to a coordinate measuring machine and more particularly to a probe for such a coordinate measuring machine. Even more particularly, the present invention relates to a damping mechanism for damping vibrations in such a probe.

Coordinate measuring machines are used to measure the shape of an object to be measured with a high degree of accuracy. A typical application is the measurement of machine-produced workpieces in the course of quality control during production. The shape of the object is measured by moving the probe to defined points of the object by means of the moving frame, and then determining the current position of the probe or of a feeler element connected to said probe. It is particularly known to scan the object using a feeler pin which is fixed to the probe in order to initiate a read-out operation of the spatial coordinates.

The feeler pin is generally mounted such that it can move in or on the probe. In what is called switching probes, the feeler pin opens a contact when it touches the shape of the object to be measured, with this contact causing the coordinates to be read out. In measuring probes, the deflection of the feeler pin from its rest position is also determined, and this allows a particularly high degree of measurement accuracy.

However, mounting the feeler pin such that it can move may lead to the feeler pin itself vibrating when the probe is moved. The natural vibrations cause disturbances when the probe approaches the object and may lead to measurement inaccuracies. For this reason, it is known to damp the feeler pin of the probe, or more generally to damp the moving part or parts within a probe, by means of a damping member which is arranged in the probe, in order to reduce the vibrations, if not completely eliminate them.

DE 197 31 005 A1 discloses an eddy-current brake as a damping member. This is a magnet arrangement with an air gap where a metallic conductive element, such as a copper sheet, is arranged. When the copper sheet moves in the magnetic field, eddy currents are induced in the copper sheet and, these eddy currents lead to a magnetic field being generated. The induced magnetic field interacts with the outer magnetic field and thus creates a damping effect ("braking effect"). In one exemplary embodiment of this document, the probe is constructed from spring parallelograms which are placed one above the other and in each case permit one direction of movement of the feeler pin. Each spring parallelogram is provided with its own eddy-current brake. In another exemplary embodiment, a single eddy-current brake is provided which damps the feeler pin in the z-direction and in the x-direction. In this exemplary embodiment, a second separate eddy-current brake would be required for damping in the y-direction if necessary.

The principle of the eddy-current brake for damping vibrations in a probe is also known from DE 44 24 225 A1, with the probe again being constructed from spring parallelograms which are placed one above the other and each having their own eddy-current brake.

DE 101 00 350 A1 also discloses a probe comprising spring parallelograms which are placed one above the other, in which a friction brake whose friction force can be adjusted is used as the damping member. U.S. Pat. No. 6,370,788 discloses using a rubber cylinder or, alternatively, glass dust as the damping element. Furthermore, DE 101 47 614 A1 discloses using a viscous damper, that is to say a viscous medium, as the damping element in a coordinate measuring machine.

SUMMARY OF THE INVENTION

Against this background, it is an object of the present invention is to provide a probe for a coordinate measuring machine including an efficient damping mechanism.

It is another object of the invention to provide a probe for a coordinate measuring machine that has a compact design.

It is yet another object of the invention to provide a damping mechanism for a probe where a degree of damping can be set a flexible manner.

In accordance with one aspect of the invention, these and further objects are addressed by a probe for a coordinate measuring machine, with the probe comprising a first part and a second part adapted to move relative to the first part, and comprising a damping member for damping vibrations of the moveable second part, with the damping member having a magnet arrangement for producing a magnetic field and having a conductor element adapted to move relative to the magnetic field along at least one path of movement, wherein the magnet arrangement is designed such that there is at least one change in direction of the magnetic field along the at least one path of movement.

In accordance with another aspect of the invention, there is provided a probe for a coordinate measuring machine, comprising a first part and a second part adapted to move relative to the first part, and comprising a damping member for damping vibrations of the moveable second part, with the damping member having a magnet arrangement for producing a magnetic field and having at least a first and a second conductor element which are arranged around the moveable second part in at least two positions which are circumferentially offset relative to one another, the first and second conductor elements being adapted to move relative to the magnetic field along at least a first and a second path of movement.

According to yet another aspect of the invention, there is provided a coordinate measuring machine for measuring the shape of an object, comprising a moving frame supporting a probe with a feeler element for touching the object, and comprising an evaluation device designed for determining a spatial position of the feeler element, wherein the probe comprises a first part and a second part adapted to move relative to the first part, and comprises a damping member for damping vibrations of the moveable second part, with the damping member having a magnet arrangement for producing a magnetic field and having a conductor element adapted to move relative to the magnetic field along at least one path of movement, wherein the magnet arrangement is designed such that there is at least one change in direction of the magnetic field along the at least one path of movement.

The novel probe has a magnet arrangement which is designed such that the conductor element is exposed to magnetic field lines when it moves, with said magnetic field lines having noticeably different directions in accordance with one aspect of the invention. In contrast to this, it was customary in the eddy-current brakes for probes known to date to move the moveable conductor element in a homogeneous magnetic field with field lines having the same or at least virtually the same direction. The inventive change in direction of the magnetic field when the conductor element moves leads to an increased damping effect. Therefore, the installation space required for the magnet arrangement can be reduced while maintaining the same damping effect, or a greater damping effect can be achieved with the same installation space. The improved damping effect also allows the feeler pin (more generally: the moveable part; the new principle can also be used to damp vibrations of other moveable parts in a probe, such as intermediate elements between the housing and the feeler pin) to be damped in a plurality of coordinate directions by means of a central damping member in an efficient and space-saving manner. Combining the damping of a plurality of coordinate directions, preferably all of the coordinate directions, allows the required installation space and the number of parts to be reduced. The novel probe can therefore be implemented in a very compact manner. In addition, the reduction in the number of parts leads to a weight saving, and this allows faster and more dynamic movements and therefore higher measuring speeds.

The increased level of dynamics, which in turn may lead to stronger vibrations, can also facilitated by the improved damping behavior of the novel arrangement.

Furthermore, the inventive solution is very flexible since the frequency and the special design of the change in direction allow the damping effect to be set in a variable manner.

In a preferred refinement, the change in direction is a reversal of direction which occurs transverse to the path of movement.

In this refinement, the moveable conductor element runs through magnetic field lines of opposite direction, and this particularly increases the damping effect. The abovementioned advantages are particularly effective in this refinement.

In a further refinement, the magnet arrangement comprises a plurality of magnets connected to one another by means of a magnetic-flux guide element.

The magnetic-flux guide element preferably is a soft-iron core. This refinement firstly has the advantage that the magnet arrangement is magnetically neutral toward the outside since the magnetic-flux guide element concentrates the magnetic field lines largely in itself. Furthermore, this refinement is particularly variable in terms of the damping effect due to the plurality of magnets. The plurality of magnets allows variations in the number of direction changes, in the size of the magnetically effective region and in the strength of the magnetic field itself. Furthermore, combining a plurality of magnets by means of a magnetic-flux guide element permits a very space-saving and compact arrangement.

In a further refinement, the magnet arrangement comprises replaceable magnets.

This refinement is particularly advantageous in terms of flexibility. The replaceable magnets allow variations in the magnetic material used, the number, orientation and strength of the magnets. Damping can therefore be adapted to a specific coordinate measuring machine at a later point in time, for example in order to compensate for different feeler pin weights and feeler pin lengths. In addition, production can be streamlined.

In a further refinement, the damping member has at least one first and one second conductor element which are arranged around the moveable second part in at least two positions which are circumferentially offset relative to one another.

In other words, the first and second conductor elements (and possibly further conductor elements which can be integrally connected to one another or be implemented separately) are arranged such that they are distributed at a radial distance from the moveable second part on the outer circumference of the latter. Said conductor elements accordingly have different circumferential positions in relation to the moveable second part. If the number of conductor elements is limited to two, these are preferably circumferentially offset by 90° with respect to one another, and this allows damping of the moveable part in two coordinate directions with a small number of components. In an alternative, likewise preferred refinement, the two conductor elements are circumferentially offset by 180° with respect to one another in order to obtain a high damping effect in one coordinate direction and also a symmetrical distribution of weight.

The preferred refinement leads to a very compact design. This also allows vibrations transverse to the orientation of the feeler pin, i.e. typically vibrations in the x- and y-directions, to be damped in a very efficient manner. Vibrations of this type have a particularly negative effect when the probe is moving.

In a further refinement, three or four conductor elements are arranged such that they are uniformly distributed around the second part.

This refinement is particularly advantageous for damping vibrations in two spatial directions of one plane, in particular the x-y-plane, using a compact and space-saving arrangement. On account of the relatively small number of parts, the use of three conductor elements has the advantage of a lower weight. Complexity and costs of production are also reduced as a result. In contrast, the use of four conductor elements has the advantage that the two spatial directions of one plane can be damped with a different damping effect, and this further improves flexibility and adaptability.

In a further refinement, the first and second conductor elements are separate conductor elements.

In other words, the first and second conductor elements (and possibly the further conductor elements) are spatially separate parts. This refinement facilitates the replacement of individual conductor elements and adaptation to different damping requirements in different spatial directions.

In a further refinement, the novel probe has a spring element, in particular a so-called diaphragm spring, as is already known per se in probes, by means of which spring element the second part is moveably mounted relative to the first part, with the spring element defining a plane of movement, and with the conductor element being arranged at an orthogonal distance from the plane of movement.

In this refinement, the moveable conductor element is arranged at a distance from the plane of movement ("cardan plane") of the second part by means of a lever arm. This leads to the conductor element executing relatively large movement strokes when the second part is slightly deflected. A large movement stroke and the associated high speed result in a further increase in the damping effect. This refinement is therefore very efficient.

In contrast, the conductor element is arranged level with the plane of movement in an alternative refinement.

In this refinement, the movement strokes of the conductor element are relatively small when the second part is vibrating. The small movement strokes allow the air gap in the magnet arrangement, in which air gap the conductor element moves, to be kept very narrow, and this results in a high magnetic field strength in the air gap. The increase in efficiency caused as a result allows particularly compact designs.

In a further refinement, the magnet arrangement and the conductor element have different weights, with the heavier of the two being fixed to the first part. Preferably, the conductor element is fixed to the moveable part.

The refinement prevents or at least reduces impairment of the dynamics. In other words, a higher level of dynamics is achieved in the novel probe when the respectively lighter element of the damping member, generally the conductor element, is fixed to the moveable second part. However, should the conductor element be the heavier element, the preferred option is to correspondingly exchange the arrangement.

In a further refinement, the conductor element is designed such that it can be replaced.

This refinement allows the damping effect to be adapted particularly easily since conductor elements of different masses, or which are composed of different materials and are of different sizes, are used. For example, copper is preferred since it has a very high electrical conductivity and the eddy currents are therefore strong. In contrast, aluminum is lighter but leads to a somewhat lower damping effect. The ability to replace the conductor elements increases the variety of variations and the adaptability of the novel probe.

In a further refinement, the conductor element is composed predominantly of aluminum or predominantly of copper.

The two alternatives mentioned have the abovementioned advantages and disadvantages, with these two elements being particularly preferred from amongst the large number of materials available overall on account of their characteristics.

It goes without saying that the features mentioned above and those which are still to be explained below can be used not only in the respectively cited combination but also in other combinations or on their own, without departing from the scope of the present invention.

BRIEF DESCRIPTION OF THE DRAWINGS

Exemplary embodiments of the invention are explained in greater detail in the following description and illustrated in the drawing, in which.

DESCRIPTION OF PREFERRED EMBODIMENTS

Figure 1:
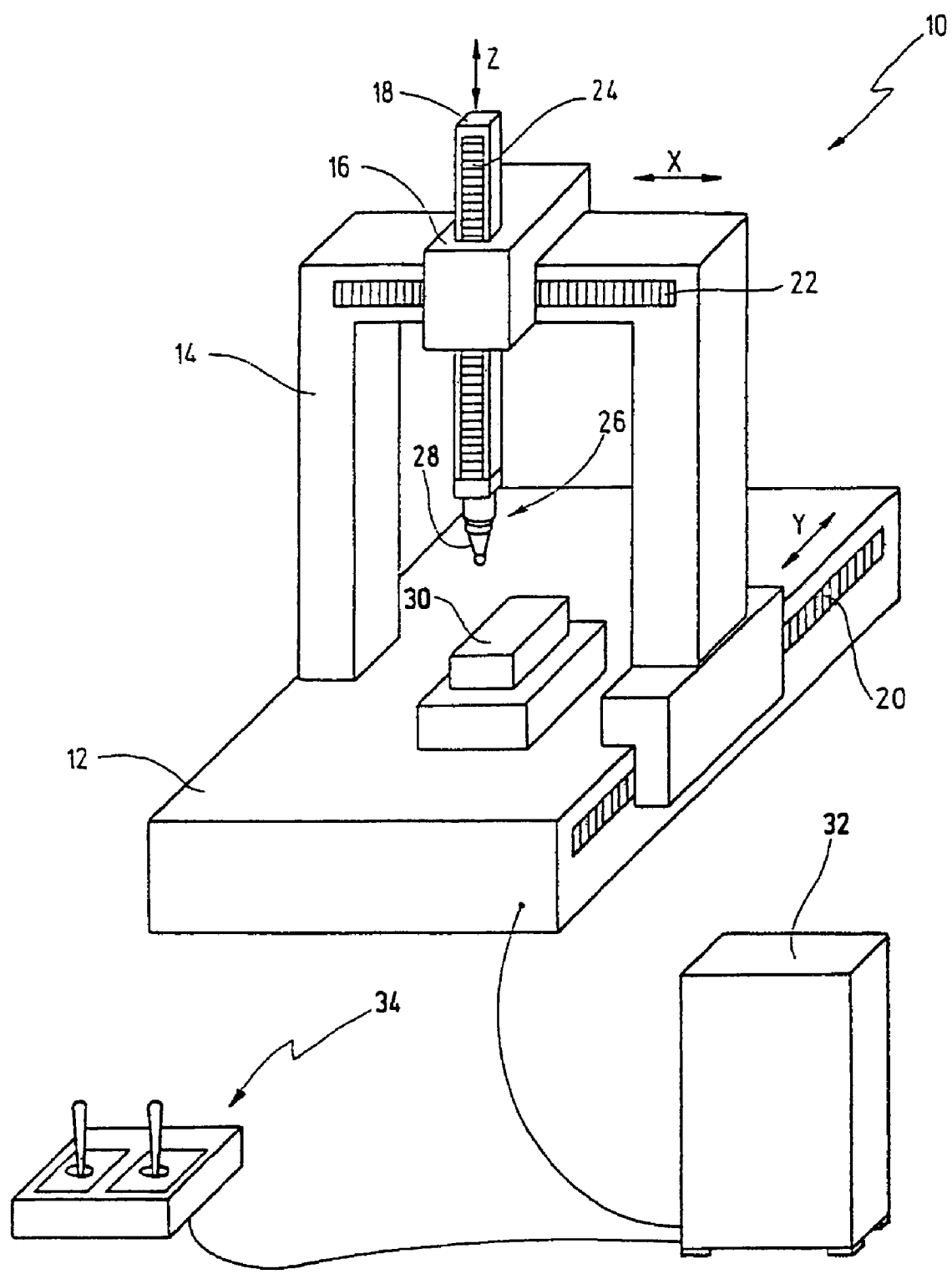
FIG. 1 shows a simplified overall view of a coordinate measuring machine with the novel probe.

In FIG. 1, a coordinate measuring machine is denoted in its entirety by the reference number 10. The coordinate measuring machine 10 has a base plate 12 on which a portal 14 is arranged such that it can move in a longitudinal direction. The longitudinal direction is usually denoted as the y-axis. A slide 16 which can be moved in the x-direction is arranged on the upper crossbar of the portal 14 and, in turn, supports a ram 18 which can be adjusted in the z-direction. The reference numbers 20, 22, 24 denote scales from which the respective adjustment position of the portal 14, of the slide 16 and of the ram 18 in the three spatial directions x, y and z can be read off. In this case, the scales 20, 22, 24 may be typical measurement scales which can be read off from by an operator of the coordinate measuring machine 10. However, as an alternative and/or in addition, these may also be distance-measuring sensors which can be read out by machine.

A probe 26, which has a feeler pin 28 which is not illustrated to scale here, is arranged at the lower free end of the ram 18 in a manner which is known per se. The feeler pin 28, which may also have a shape other than that illustrated here, is used to touch defined measurement points of an object 30 to be measured. In this case, the object 30 is arranged on the base plate 12 of the coordinate measuring machine 10. The position of the probe 26 and possibly of the feeler pin 28 can be determined using the scales 20, 22, 24 and possibly further measuring elements (not illustrated here) which are arranged in the probe 26. The shape of the object 30 can therefore be measured with an accuracy specified by the coordinate measuring machine 10.

The reference number 32 denotes an evaluation and control unit which is used to control the coordinate measuring machine 10. Furthermore, the evaluation and control unit 32 evaluates the respective position of the probe 26 and the feeler pin 28, and provides the measurement results for documentation and/or further processing purposes. In automatically operating coordinate measuring machines, the evaluation and control unit 32 is often a so-called CNC control unit.

The reference number 34 denotes an operator control console which can also be used here to manually control the coordinate measuring machine 10. However, the control unit 32 and the operator control console 34 are only shown here for illustrative purposes and in other exemplary embodiments may be omitted or replaced by other components.

Furthermore, the coordinate measuring machine 10 which is illustrated in the form of a portal here is only selected as an example. The invention can likewise be used in coordinate measuring machines in the form of horizontal arms or of other designs.

Figure 2:
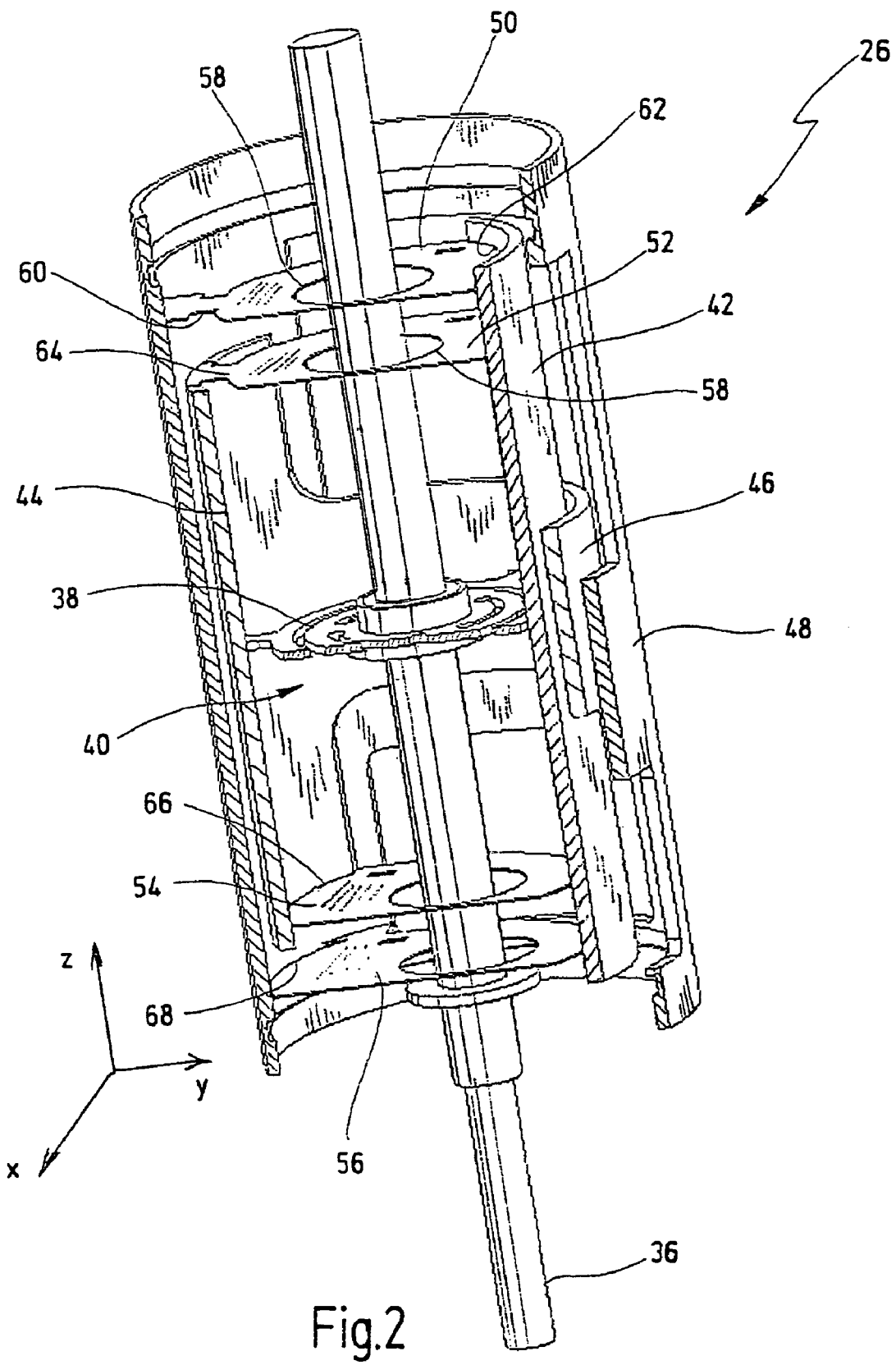
FIG. 2 shows a partial section through a perspective illustration of the basic structural design of one exemplary embodiment of the novel probe.

FIG. 2 illustrates the so-called kinematics module of a preferred exemplary embodiment of the probe 26. The kinematics module comprises those parts which allow the feeler pin 28 to be deflected in a controlled manner when the object 30 is touched or scanned. It goes without saying that the feeler pin 28 does not have to be directly connected to the kinematics module, but is generally arranged on the kinematics module via a feeler pin extension 36. This allows, in particular, the feeler pin 28 used on the probe 26 to be exchanged, as is already known per se from coordinate measuring machines of this type.

In this case, the kinematics module of the novel probe 26 has a cylindrical shape with a diaphragm spring 38 arranged in the middle. The feeler pin extension 36 is held by means of the diaphragm spring 38 such that the feeler pin extension 36 (and with it the feeler pin 28) can move (pivot) both in the direction of the x-axis and in the direction of the y-axis.

The diaphragm spring 38 is clamped into a support element 40 which fits into the cylindrical shape of the probe 26. The support element 40 has a half-cylinder shell-like part 44 which is situated diametrically opposite an intermediate element 42. The support element 40 also has an annular projection 46 which surrounds the diaphragm spring 38 and the intermediate element 42 in an annular manner. In this case, the intermediate element 42 can move between the diaphragm spring 38 and the projection 46. In the axial extent, the part 44 is smaller than the intermediate element 42 and is arranged centrally with respect to the latter.

A cylindrical housing part 48 is arranged around the support element 40. The housing part 48 also concentrically surrounds the feeler pin extension 36. The housing part 48 and the two elements 40, 42 are additionally connected to one another by means of a total of four spring elements 50, 52, 54, 56. The spring elements 50 to 56 are each in the form of leaf springs and are situated parallel to the diaphragm spring 38. In order to allow the feeler pin extension 36 to pass through, the four spring elements 50 to 56 each have an approximately circular central recess 58. The feeler pin extension 36 extends through these said recesses.

The spring elements 50 and 52 are arranged above the diaphragm spring 38 in the direction of the z-axis. The spring elements 54, 56 are situated beneath the diaphragm spring 38 in the direction of the z-axis and are at approximately the same distance from the diaphragm spring 38 as the spring elements 50, 52. The spring element 50 connects the stationary housing part 48 to the intermediate element 42. The spring element 52, which is arranged somewhat beneath the spring element 50, connects the intermediate element 42 to the part 44 of the support element 40.

In a similar manner, the spring element 54 connects the part 44 of the support element 40 to the diametrically opposite intermediate element 42. The spring element 56, which is arranged somewhat beneath the spring element 54, finally connects the intermediate element 42 to the stationary housing part 48 again. On account of this arrangement, the elements 40, 42 and the spring elements 50 to 56 form a so-called double-spring parallelogram of cylindrical design. This permits deflection of the feeler pin extension 36 in the z-direction.

One special feature of the kinematics module shown here, which is further disclosed by international patent application WO 2005/088238 assigned to the present assignee and incorporated here by reference, involves the spring elements 50 to 56 each being fixed to the elements 40, 42 or to the housing part 48 by a three-point bearing. In other words, the spring elements 50 to 56 are each connected to one of the parts by means of a one-dimensional or singular contact point, and to the other respective part by means of a two-dimensional (line-like or dotted line-like) contact point. In particular, the spring element 50 is fixed to the housing part 48 by means of a one-dimensional, that is to say largely point-like, contact point 64 here, whereas it sits on the element 42 by means of a line-like contact point 62. The spring element 52 is similarly arranged on the element 42 by means of a line-like/two-dimensional contact point, whereas it sits on the part 44 of the support element 40 by means of a one-dimensional/point-like/singular contact point 64.

In the same way, the spring element 54 is fixed to the support element 40 by means of a two-dimensional/line-like contact point 66, whereas it sits on the intermediate element 42 by means of a one-dimensional/point-like contact point (not visible in the illustration of FIG. 2). Furthermore, the spring element 56 is also fixed to the intermediate element 42 by means of a one-dimensional/point-like contact point (likewise not visible here), whereas it sits on the housing part 48 by means of a line-like/two-dimensional contact point 68.

The novel three-point bearing of the spring elements 50 to 56 in this double-spring parallelogram has the advantage that the individual spring elements can be produced and fitted in a simpler manner with larger tolerances, without leading to the spring elements becoming deformed and, in the extreme case, "snapping".

In this case, the diaphragm spring 38 is advantageously also clamped into the support element 40 by means of a three-point bearing.

For the novel probe 26, the kinematics module shown in FIG. 2 is combined with one of the damping members described below. However, one preferred aspect should first be schematically explained with reference to FIGS. 3 and 4.

Figure 3:
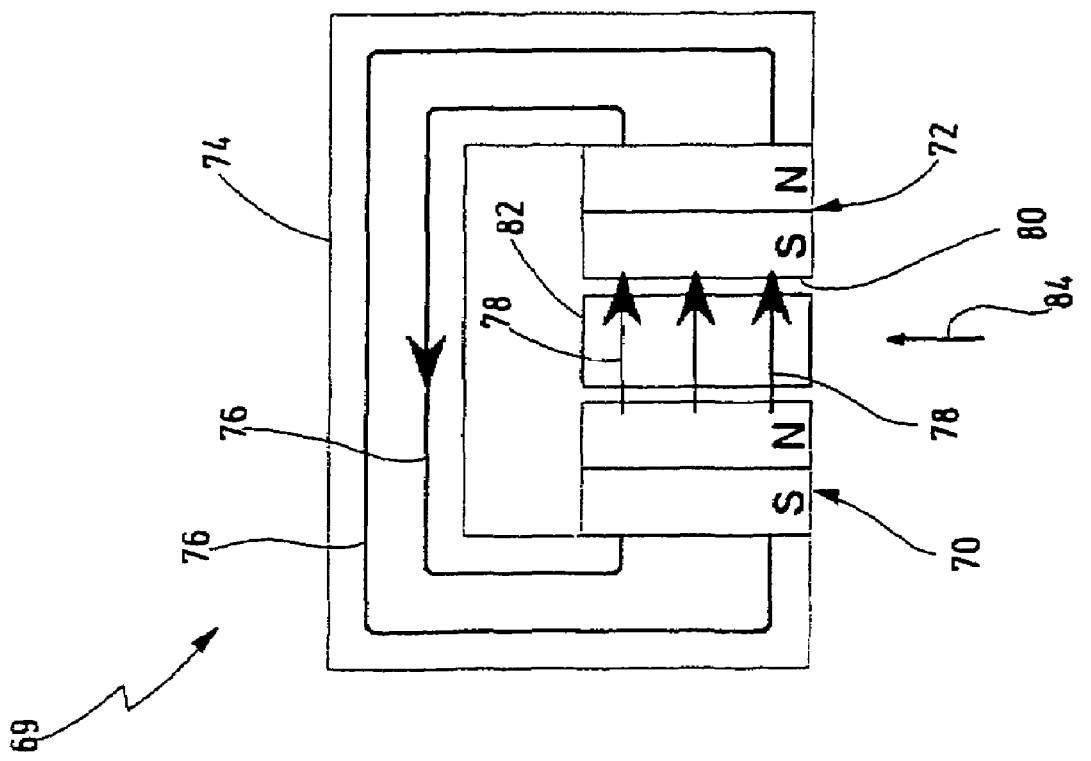

FIG. 3 illustrates a magnet arrangement 69 with two magnets 70, 72 and a U-shaped flux guide element 74. The two magnets 70, 72 are arranged on the inner faces of the open limbs of the U-shaped flux guide element 74, specifically such that the two north and south poles have the same orientation. As a result, a magnetic field is formed which is schematically illustrated here using the field lines 76, 78. A high field strength prevails in the air gap 80 between the two magnets 70, 72. Moreover, the field lines 76 are guided from the magnet 72 to the magnet 70 by means of the flux guide element 74, and therefore closed. The entire arrangement is largely magnetically neutral toward the outside since the flux guide element 74 concentrates the magnetic field lines 76 in its interior on account of its low magnetic resistance.

The reference number 82 denotes a conductor element, such as a copper plate, which can move in the direction of the arrow 84 in the air gap 80 in the magnet arrangement 69. The conductor element 82 therefore moves transverse to the field lines 78 in the air gap 80. This movement induces eddy currents in the conductor element 82 which in turn create a magnetic field that interacts with the magnetic field 76, 78. The movement of the conductor element 82 in the air gap 80 is braked as a result of this interaction.

Figure 4:
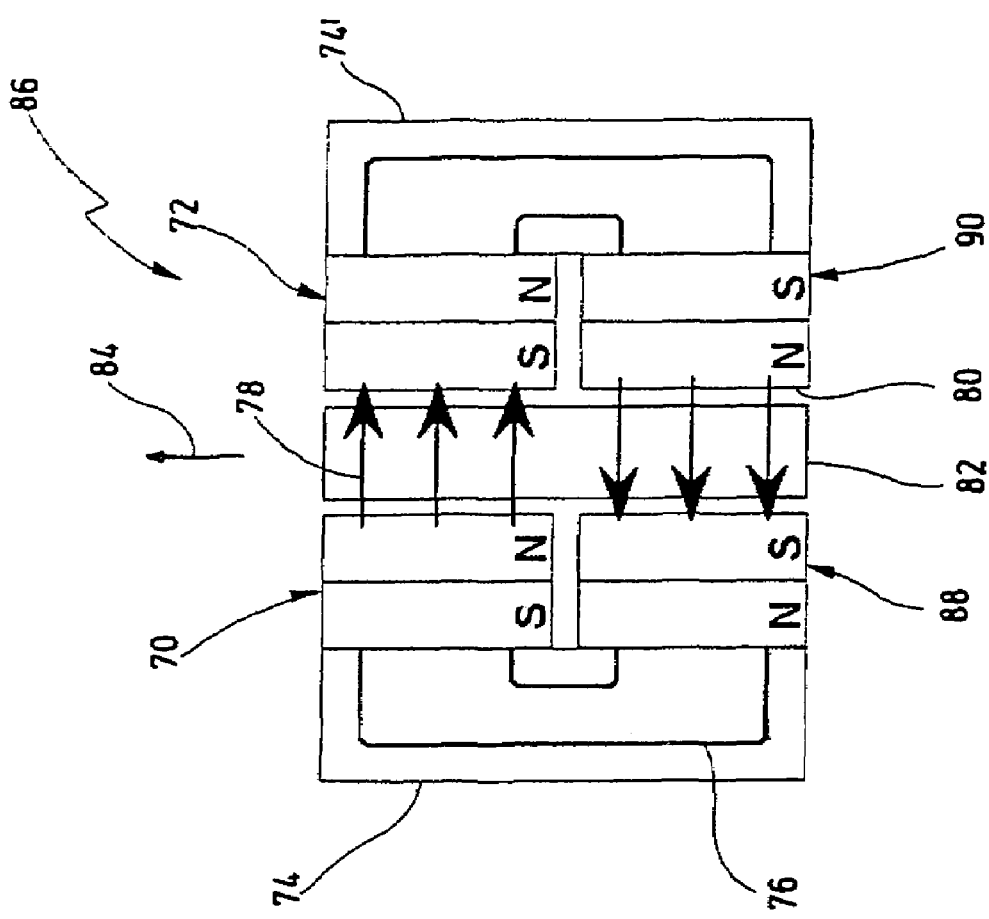
FIGS. 3 and 4 show two basic illustrations of magnet arrangements for explaining one aspect of the present invention.

FIG. 4 shows a similar magnet arrangement 86, with the same reference symbols each denoting the same elements as before. However, in contrast to the magnet arrangement 69, the magnet arrangement 86 has four magnets 70, 72, 88, 90 here, with the magnets 70, 88 being connected by means of a first flux guide element 74 and the magnets 72, 90 being connected by means of a second flux guide element 74'. In this case, the magnets 70, 72 are mutually opposite, in the same way as in the arrangement 69 according to FIG. 3. In the same way, the magnets 88 and 90 are mutually opposite, so that a continuous air gap 80 is formed overall, this air gap dividing the magnet arrangement 86 into two halves. Only the orientation of the magnets 70, 88 and 72, 90 is reversed.

A closed field line profile, which is concentrated substantially on the air gap 80 and the interior of the flux guide elements 74, 74', is produced in the magnet arrangement 86 too. However, in this case, the conductor element 82 experiences a change in direction of the field lines when it moves in the air gap 80, as is illustrated in FIG. 4. On account of this change in direction, eddy currents are induced in the conductor element 82 in a different direction, and this ultimately leads to an increased braking effect. In the exemplary embodiments described below, this effect is utilized for a damping member.

Figure 5:
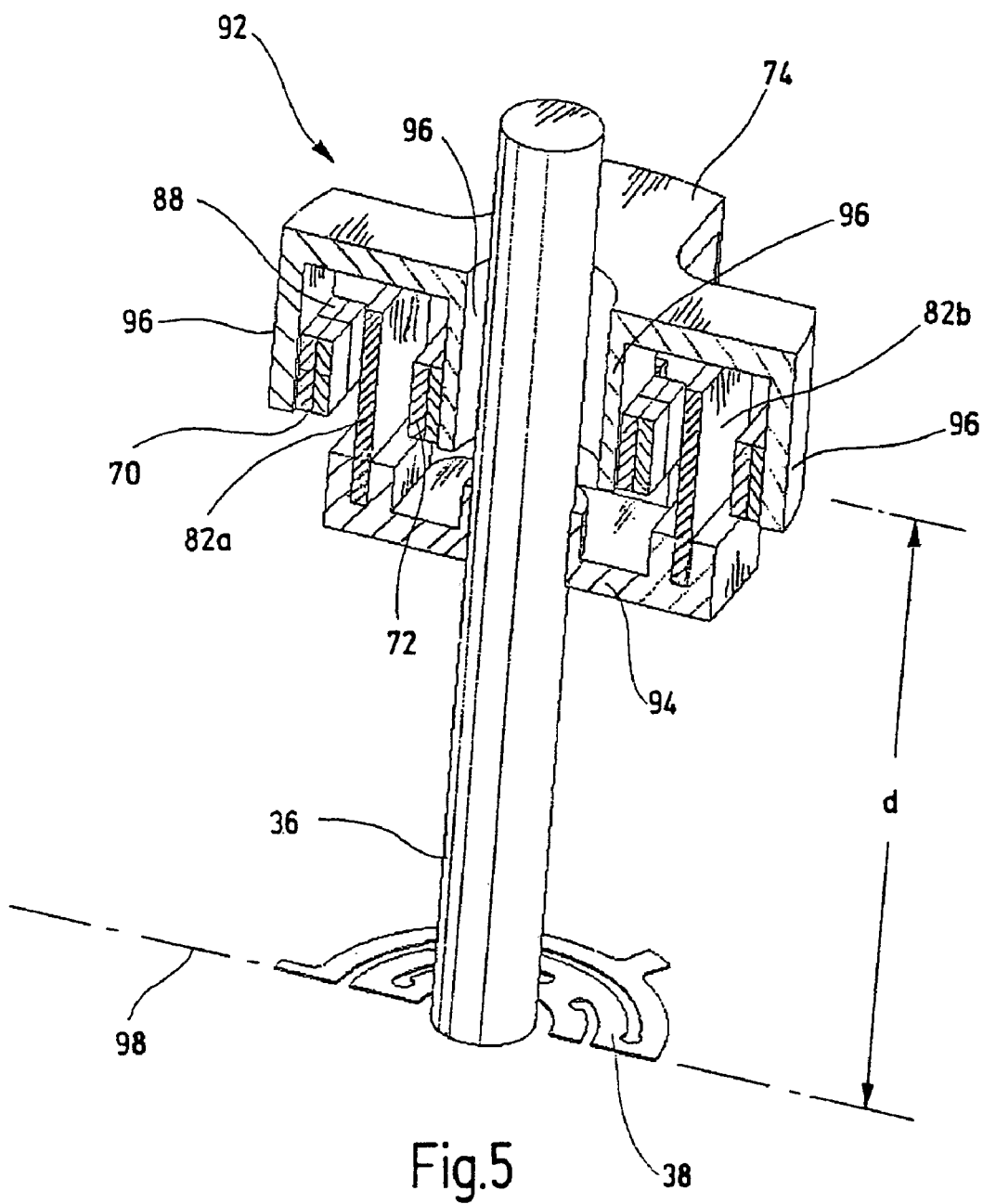
FIG. 5 shows a partial section through a perspective illustration of a damping member according to one exemplary embodiment of the novel probe.

In FIG. 5, a damping member for a first exemplary embodiment of the novel probe is denoted in its entirety by the reference number 92. The damping member 92 is provided at the upper free end of the feeler pin extension 36 of the kinematics module from FIG. 2. For reasons of clarity, only the diaphragm spring 38 and the upper end of the feeler pin extension 36 are shown in the illustration in FIG. 5.

In this case, the damping member 92 comprises a total of four conductor elements 82, of which two conductor elements (reference symbols 82a, 82b) can be seen in the illustration in FIG. 5. The two other conductor elements are offset by 90°. Overall, the four conductor elements 82 are therefore arranged such that they are distributed on a circumferential line in a manner offset with respect to one another by 90° in each case.

The conductor elements 82 are fixed to the feeler pin extension 36 by means of a support element 94. They surround the feeler pin extension 36 at a radial distance, with the four conductor elements 82 being uniformly arranged around the feeler pin extension 36. In other words, the conductor elements 82a and 82b are positioned diametrically with respect to one another on two sides of the feeler pin extension 36. In the same way, the further conductor elements (not illustrated here) are positioned diametrically with respect to one another, but offset by 90° with respect to the conductor elements 82a, 82b.

The flux guide element 74 has a cruciform roof area with limbs which each point downward in a U-shape on each arm of the cross. Magnets 70, 72, 88, 90 are respectively arranged on the inner faces, which point toward one another, of the U-shaped limbs. The entire arrangement comprising the flux guide element 74 and the magnets 70, 72, 88, 90 is "placed" over the conductor elements 82 to a certain extent. In this case, the arrangement comprising the flux guide element 74 and the magnets is fixed in position, so that the conductor elements 82 move in relation to the latter when the feeler pin extension 36 moves.

In a specific case, the conductor elements 82 can move in relation to the magnets 70, 72, 88, 90 in all three spatial directions x, y and z. The damping member 92 is therefore able to damp vibrations of the feeler pin extension 36 (and therefore of the feeler pin 28) in all three spatial directions. The damping effect in all three spatial directions can be optimized on an individual basis by suitable selection and dimensioning of the conductor elements 82 and on account of the number, arrangement and selection of magnets.

In this case, the damping member 92 as a whole is arranged at a distance d above the x-y plane of movement (cardan plane) 98 which is defined by the membrane spring 38. The result of this is that deflections of the feeler pin 28 in the x- or y-direction lead to relatively large movement strokes of the conductor elements 82 and therefore relatively high movement speeds, as a result of which the damping effect is increased. This is particularly advantageous in the arrangement shown since the air gaps between the magnets 70, 72, 88, 90 have to be selected to be relatively large here in order to permit movement of the conductor elements 82 in all three spatial directions.

Figure 6:
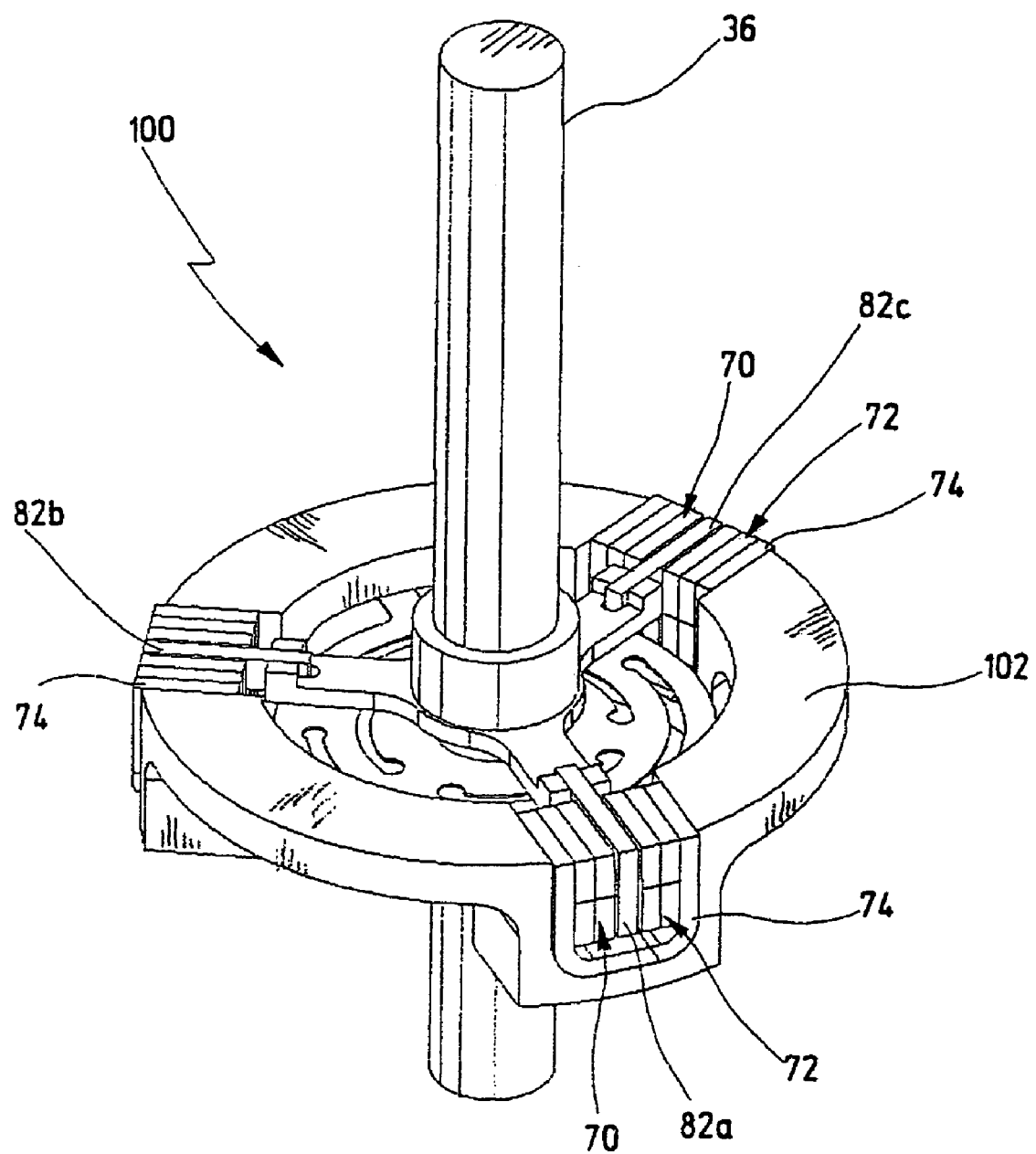
FIG. 6 shows a further damping member for an alternative exemplary embodiment of the novel probe.
Figure 7:
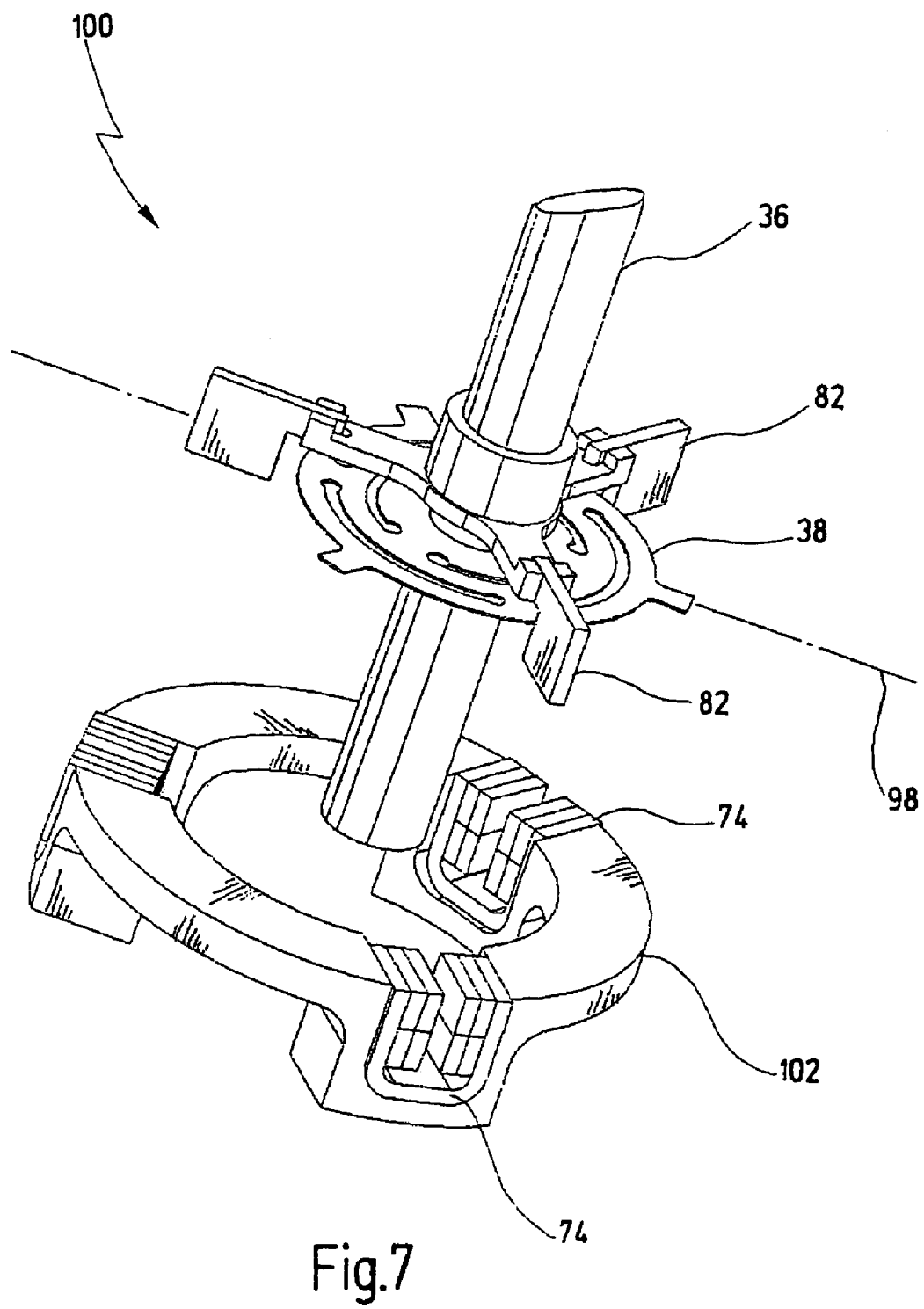
FIG. 7 shows an exploded illustration of the damping member from FIG. 6.

In FIGS. 6 and 7, a further exemplary embodiment of a damping member for the novel probe is denoted in its entirety by the reference number 100. In contrast to the damping member 92, the damping member 100 is arranged virtually in the x-y plane of movement which is spanned by the diaphragm spring 38. In this case, said damping member 100 has three conductor elements 82 which are uniformly arranged around the feeler pin extension 36, that is to say are offset at a circumferential angle of in each case 120° with respect to one another. As in the damping member 92, the conductor elements 82 move with the feeler pin extension 36 in this case.

The damping member 100 also has an annular support element 102 which concentrically surrounds the feeler pin extension 36. Three magnet arrangements with magnets 70, 72 and a magnetic-flux guide element 74 are incorporated in the annular support element 102. The positions of the three magnet arrangements correspond to those of the three conductor elements 82. When the feeler pin 28 is deflected, the conductor elements 82 move in relation to the corresponding magnet arrangement, as a result of which the damping effect is in turn achieved. The damping effect can be optimized for the respective application in this case too by selecting the mass of and the material used for the conductor elements and on account of the arrangement, selection and strength of the magnets 70, 72. Since the movement strokes of the conductor elements 82 in the damping member 100 are relatively small compared to the damping member 92, the air gaps may be dimensioned to be very narrow, that is to say with an almost exact fit with the conductor elements 82. This amplifies the damping effect.

The damping member 100 is used in the preferred probe for the purpose of damping vibrations in the x- or y-direction, even if the arrangement shown were in principle to permit damping in the z-direction too.

For the sake of clarity, reference is also made to the fact that, in contrast to the preferred embodiment shown here, the damping members 92 and 100 could also be implemented with a larger or smaller number of conductor elements and magnet arrangements.

Figure 8:
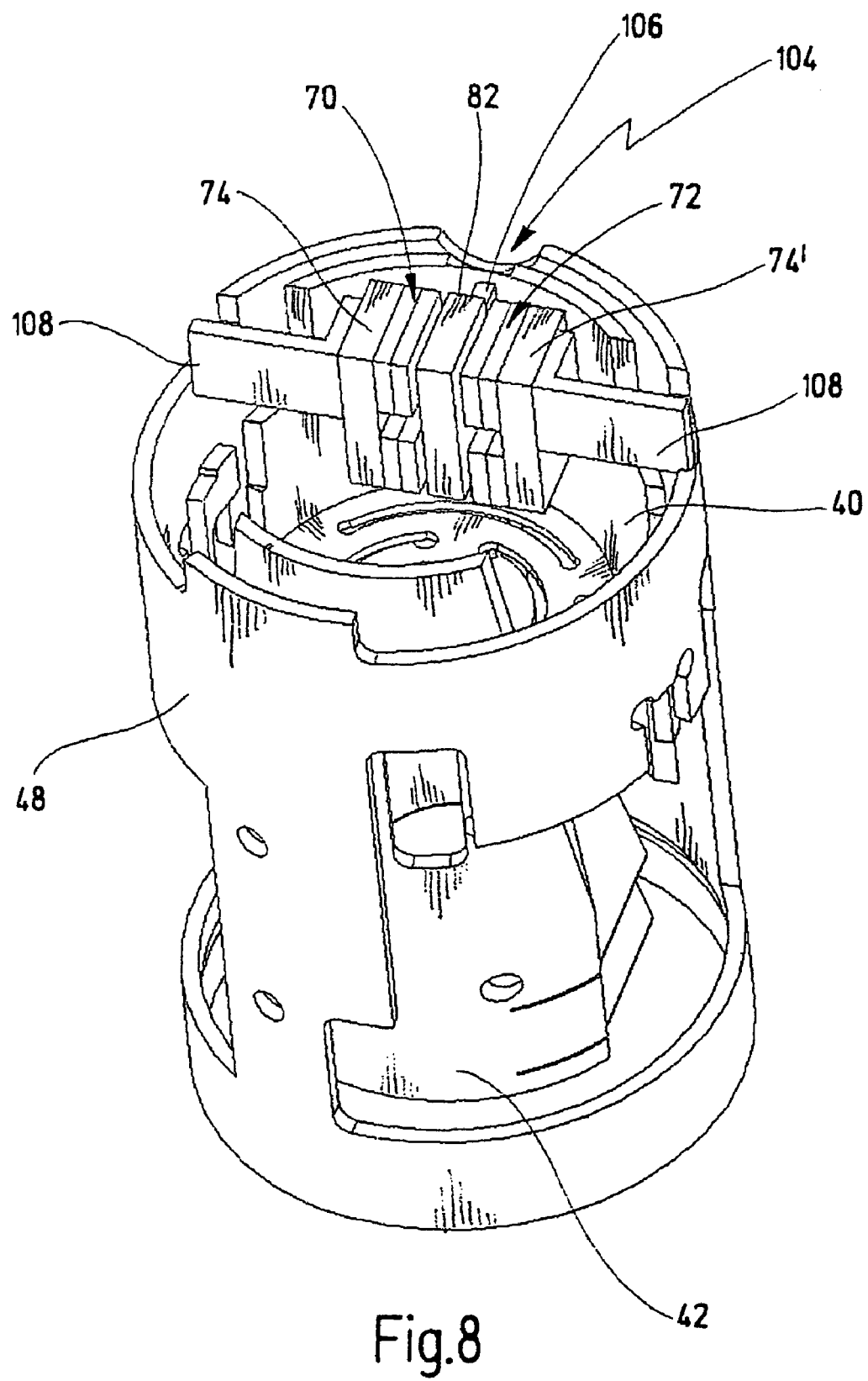
FIG. 8 shows a further exemplary embodiment of a damping member of the novel probe.

Finally, a further exemplary embodiment of a damping member for the novel probe is denoted in its entirety by the reference number 104 in FIG. 8. The same reference symbols denote the same elements as before, with the damping member 104 being schematically illustrated here in its spatial arrangement in relation to the kinematics module from FIG. 2. In this case, the damping member 104 is used solely to damp vibrations in the z-direction and can therefore be easily combined with the damping arrangement 100 from FIGS. 6, 7.

In the damping member 104, the moveable conductor element 82 is connected to the support element 40 of the double-spring parallelogram, which support element can move in the z-direction, by means of a connecting piece 106. In contrast, a magnet arrangement with magnets 70, 72 and flux guide elements 74, 74' is seated above the diaphragm spring 38 in a manner fixed in position. In this case, the construction of the magnet arrangement corresponds to the structure shown in FIG. 4. Said magnet arrangement is fixed to the housing part 48, which is fixed in position, by means of L-shaped support elements 108.

In the exemplary embodiments shown here, the magnet arrangements each change direction only once in the movement direction of the conductor elements. However, it goes without saying that, in order to optimize the damping effect, a plurality of magnets may also be combined with one another such that three, four or even more changes in direction are produced.

What is claimed is:
1. A probe for a coordinate measuring machine, the probe comprising a first part and a second part adapted to move relative to the first part, and comprising a damping member for damping vibrations of the moveable second part, with the damping member having a magnet arrangement for producing a magnetic field and having a conductor element adapted to move relative to the magnetic field along at least one path of movement, wherein the magnet arrangement is designed such that there is at least one change in direction of the magnetic field along the at least one path of movement.

2. The probe of claim 1, wherein the change in direction is a reversal of direction which occurs transverse to the path of movement.

3. The probe of claim 1, wherein the magnet arrangement comprises a plurality of magnets connected to one another by means of a magnetic-flux guide element.

4. The probe of claim 1, wherein the magnet arrangement comprises replaceable magnets.

5. The probe of claim 1, wherein the damping member has at least a first and a second conductor element which are arranged around the moveable second part in at least two positions which are circumferentially offset relative to one another.

6. The probe of claim 5, comprising three or four conductor elements which are arranged such that they are uniformly distributed around the second part.

7. The probe of claim 5, wherein the first and second conductor elements are separate conductor elements.

8. The probe of claim 1, further comprising a spring element by means of which the second part is moveably mounted relative to the first part, with the spring element defining a plane of movement, and with the conductor element being arranged at an orthogonal distance from the plane of movement.

9. The probe of claim 8, wherein the spring element is a diaphragm spring.

10. The probe of claim 1, further comprising a spring element by means of which the second part is moveably mounted relative to the first part, with the spring element defining a plane of movement, and with the conductor element being arranged level with the plane of movement.

11. The probe of claim 10, wherein the spring element is a diaphragm spring.

12. The probe of claim 1, wherein the magnet arrangement and the conductor element have different weights, with a heavier of the two being fixed to the first part.

13. The probe of claim 1, wherein the conductor element is fixed to the moveable part.

14. The probe of claim 1, wherein the conductor element is designed as a replaceable element.

15. The probe of claim 1, wherein the conductor element is predominantly composed of aluminum or copper.

16. The probe of claim 1, wherein the second part is a feeler pin or an intermediate element adapted to be coupled to a feeler pin.

17. A probe for a coordinate measuring machine, comprising a first part and a second part adapted to move relative to the first part, and comprising a damping member for damping vibrations of the moveable second part, with the damping member having a magnet arrangement for producing a magnetic field and having at least a first and a second conductor element which are arranged around the moveable second part in at least two positions which are circumferentially offset relative to one another, the first and second conductor elements being adapted to move relative to the magnetic field along at least a first and a second path of movement.

18. The probe of claim 17, comprising three or four conductor elements which are arranged such that they are uniformly distributed around the second part.

19. The probe of claim 17, wherein the first and second conductor elements are separate conductor elements.

20. A coordinate measuring machine for measuring the shape of an object, comprising a moving frame supporting a probe with a feeler element for touching the object, and comprising an evaluation device designed for determining a spatial position of the feeler element, wherein the probe comprises a first part and a second part adapted to move relative to the first part, and comprises a damping member for damping vibrations of the moveable second part, with the damping member having a magnet arrangement for producing a magnetic field and having a conductor element adapted to move relative to the magnetic field along at least one path of movement, wherein the magnet arrangement is designed such that there is at least one change in direction of the magnetic field along the at least one path of movement.

* * * * *